United States Patent
Mouniandy et al.

(10) Patent No.: US 11,824,488 B2
(45) Date of Patent: *Nov. 21, 2023

(54) SYSTEMS AND METHODS FOR ADAPTIVE RANGE OF MOTION FOR SOLAR TRACKERS

(71) Applicant: FTC Solar, Inc., Austin, TX (US)

(72) Inventors: Tamilarasan Mouniandy, Chennai (IN); Nagendra Srinivas Cherukupalli, Saratoga, CA (US)

(73) Assignee: FTC Solar, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,536

(22) Filed: Nov. 8, 2022

(65) Prior Publication Data

US 2023/0079793 A1 Mar. 16, 2023

Related U.S. Application Data (63) Continuation of application No. 17/003,632, filed on Aug. 26, 2020, now Pat. No. 11,522,491.

(51) Int. Cl.
*H02S 20/32* (2014.01)
*G01S 3/786* (2006.01)

(52) U.S. Cl.
CPC ............ *H02S 20/32* (2014.12); *G01S 3/7861* (2013.01)

(58) Field of Classification Search
CPC .......... H02S 20/30; H02S 20/32; H02S 40/10; H02S 40/12; G01S 3/7861; G01S 3/7862; F24S 50/00–80; F24S 40/20; F24S 40/70; F24S 40/85

See application file for complete search history.

(56) References Cited

U.S. PATENT DOCUMENTS

| 4,202,321 A | 5/1980 | Volna |
| 4,223,214 A | 9/1980 | Dorian et al. |
| 4,226,502 A | 10/1980 | Gunzler |

(Continued)

FOREIGN PATENT DOCUMENTS

| CN | 13282112 A | 8/2021 |
| JP | 2008021683 A | 1/2008 |

(Continued)

OTHER PUBLICATIONS

US 10,768,266 B2, 09/2020, Corio (withdrawn)

(Continued)

*Primary Examiner* — Ryan S Cannon
(74) *Attorney, Agent, or Firm* — Armstrong Teasdale LLP (57) ABSTRACT

A system including a tracker configured to collect solar irradiance and attached to a rotational mechanism for changing a plane of the tracker and a controller in communication with the rotational mechanism. The controller is programmed to store a plurality of positional and solar tracking information, determine a position of the sun at a first specific point in time, calculate a first angle for the tracker based on the position of the sun, detect an amount of accumulation at the first specific point in time, determine a first maximum range of motion for the tracker based on the amount of accumulation, adjust the first angle for the tracker based on the first maximum range of motion for the tracker, and transmit instructions to the rotational mechanism to change the plane of the tracker to the first adjusted angle.

20 Claims, 7 Drawing Sheets

(56) References Cited

U.S. PATENT DOCUMENTS

| | | |
|---|---|---|
| 4,328,789 A | 5/1982 | Nelson |
| 4,365,616 A | 12/1982 | Vandenberg |
| 4,383,520 A | 5/1983 | Huebl et al. |
| 4,574,659 A | 3/1986 | Arndt |
| 4,883,340 A | 11/1989 | Dominguez |
| 7,374,137 B2 | 5/2008 | Staney |
| 7,692,091 B2 | 4/2010 | Altaii et al. |
| 8,151,787 B1 | 4/2012 | Sivert |
| 8,274,028 B2 | 9/2012 | Needham |
| 8,404,082 B2 | 3/2013 | Amma et al. |
| 8,413,391 B2 | 4/2013 | Seery et al. |
| 8,459,249 B2 | 6/2013 | Corio |
| 8,502,129 B2 | 8/2013 | Miller et al. |
| 8,511,297 B2 | 8/2013 | Mcneil-Yeckel et al. |
| 8,615,939 B2 | 12/2013 | Seery et al. |
| 8,671,930 B2 | 3/2014 | Liao |
| 8,904,774 B2 | 12/2014 | Gee |
| 8,933,660 B2 | 1/2015 | Heumann et al. |
| 8,993,870 B2 | 3/2015 | Eom |
| 9,038,329 B2 | 5/2015 | Pelman et al. |
| 9,074,797 B2 | 7/2015 | Miller et al. |
| 9,166,525 B2 | 10/2015 | Grant |
| 9,188,367 B2 | 11/2015 | Jang |
| 9,443,999 B2 | 9/2016 | Polk |
| 9,531,320 B2 | 12/2016 | Gonzalez Moreno |
| 9,551,508 B2 | 1/2017 | Straeter |
| 9,568,215 B2 | 2/2017 | Patwardhan et al. |
| 9,580,924 B1 | 2/2017 | Taylor et al. |
| 9,581,678 B2 | 2/2017 | Corio |
| 9,593,867 B2 | 3/2017 | Seery et al. |
| 9,601,645 B2 | 3/2017 | Seery et al. |
| 9,727,060 B2 | 8/2017 | Coupart |
| 9,766,319 B2 | 9/2017 | Au |
| 9,831,819 B2 | 11/2017 | Kirk et al. |
| 9,863,667 B2 | 1/2018 | Au |
| 9,878,112 B2 | 1/2018 | Torisawa et al. |
| 9,905,717 B2 | 2/2018 | Au |
| 9,923,510 B2 | 3/2018 | Au |
| 9,970,686 B2 | 5/2018 | Au |
| 9,998,068 B2 | 6/2018 | Au |
| 10,008,975 B2 | 6/2018 | Au |
| 10,036,176 B1 | 7/2018 | Taylor et al. |
| 10,042,030 B2 | 8/2018 | Corio |
| 10,075,125 B2 | 9/2018 | Liu et al. |
| 10,171,024 B2 | 1/2019 | Polk |
| 10,222,446 B2 | 3/2019 | Au |
| 10,340,839 B2 | 7/2019 | Almy et al. |
| 10,340,840 B2 | 7/2019 | Almy et al. |
| 10,379,193 B2 | 8/2019 | Au |
| 10,461,682 B2 | 10/2019 | Schuit et al. |
| 10,514,185 B2 | 12/2019 | Ingram |
| 10,541,644 B2 | 1/2020 | Arliaud et al. |
| 10,557,646 B1 | 2/2020 | Ma et al. |
| 10,594,253 B2 | 3/2020 | Henderson et al. |
| 10,619,891 B2 | 4/2020 | Menard |
| 10,630,231 B2 | 4/2020 | Needham et al. |
| 10,648,528 B2 | 5/2020 | Kull et al. |
| 10,654,420 B2 | 5/2020 | Levi |
| 10,684,348 B2 | 6/2020 | Arliaud et al. |
| 10,771,007 B2 | 9/2020 | Corio |
| 10,848,097 B1 | 11/2020 | Needham et al. |
| 2008/0264474 A1 | 10/2008 | Frauenknecht et al. |
| 2010/0089390 A1 | 4/2010 | Miros et al. |
| 2010/0095955 A1 | 4/2010 | Carrasco Martinex |
| 2010/0026366 A1 | 10/2010 | Thorne |
| 2010/0307479 A1 | 12/2010 | Park |
| 2011/0041834 A1 | 2/2011 | Liao |
| 2012/0125399 A1 | 5/2012 | Schatz et al. |
| 2012/0152310 A1 | 6/2012 | Hinman et al. |
| 2012/0152311 A1 | 6/2012 | Miller et al. |
| 2012/0174962 A1 | 7/2012 | Koningstein et al. |
| 2013/0019921 A1 | 1/2013 | Au |
| 2013/0087139 A1 | 4/2013 | Kroyzer et al. |
| 2013/0247962 A1 | 9/2013 | Sakai et al. |
| 2013/0319402 A1 | 12/2013 | Shaw |
| 2013/0341294 A1 | 12/2013 | Reynolds et al. |
| 2014/0028240 A1 | 1/2014 | Heumann et al. |
| 2014/0224300 A1 | 8/2014 | Liu |
| 2014/0283894 A1 | 9/2014 | Silver |
| 2015/0073594 A1 | 3/2015 | Trujillo et al. |
| 2016/0056755 A1 | 2/2016 | Abiko et al. |
| 2016/0065123 A1 | 3/2016 | Hayes et al. |
| 2016/0118929 A1 | 4/2016 | Krause |
| 2017/0025989 A1 | 1/2017 | Shaw |
| 2017/0093329 A1 | 3/2017 | Jensen |
| 2017/0102168 A1 | 4/2017 | Childress |
| 2017/0126172 A1 | 5/2017 | Nogier |
| 2017/0301814 A1 | 10/2017 | Au |
| 2018/0013380 A1 | 1/2018 | Childress et al. |
| 2018/0024222 A1 | 1/2018 | Au |
| 2018/0054156 A1 | 2/2018 | Lokey |
| 2018/0076757 A1 | 3/2018 | Gross et al. |
| 2018/0091088 A1 | 3/2018 | Barton et al. |
| 2018/0167025 A1 | 6/2018 | Au |
| 2018/0224161 A1 | 8/2018 | Au |
| 2018/0302026 A1 | 10/2018 | Basel et al. |
| 2018/0302027 A1 | 10/2018 | Betts et al. |
| 2018/0358921 A1 | 12/2018 | Henderson et al. |
| 2019/0036478 A1 | 1/2019 | Liu et al. |
| 2019/0131920 A1 | 5/2019 | Au |
| 2019/0199276 A1 | 6/2019 | Bailey et al. |
| 2019/0204405 A1 | 7/2019 | Arliaud et al. |
| 2019/0296686 A1 | 9/2019 | Kresse et al. |
| 2019/0296688 A1 | 9/2019 | Kresse et al. |
| 2019/0319578 A1 | 10/2019 | Needham et al. |
| 2019/0356265 A1 | 11/2019 | Liu et al. |
| 2020/0036325 A1 | 1/2020 | Poivet |
| 2020/0076356 A1 | 3/2020 | Cherukupalli et al. |
| 2020/0076359 A1 | 3/2020 | Bahn |
| 2020/0153381 A1 | 5/2020 | Michotte De Welle et al. |
| 2020/0162015 A1 | 5/2020 | Upfill-Brown et al. |
| 2020/0182513 A1 | 6/2020 | Ma et al. |
| 2020/0235696 A1 | 7/2020 | Arliaud et al. |
| 2020/0309893 A1 | 10/2020 | Arliaud et al. |
| 2021/0083619 A1 | 3/2021 | Hegedus |

FOREIGN PATENT DOCUMENTS

| | | |
|---|---|---|
| JP | 2014007272 A | 1/2014 |
| WO | 2019027080 A1 | 2/2019 |
| WO | 2020010360 A1 | 1/2020 |

OTHER PUBLICATIONS

Elamri, T. et al., Rain concentration and sheltering effect of solar panels on cultivated plots; Hydrology and Earth System Sciences; vol. 22; 2018' pp. 1285-1298.

Dupraz, C. et al., Combining solar photovoltaic panels and food crops for optimizing land use: Towards new agrivoltais schemes; Renewable Energy; vol. 26; 2011; pp. 2725-2732.

SYSTEMS AND METHODS FOR ADAPTIVE RANGE OF MOTION FOR SOLAR TRACKERS

CROSS REFERENCE TO RELATED APPLICATIONS

This application is a continuation of and claims priority to U.S. patent application Ser. No. 17/003,632, filed Aug. 26, 2020, which is hereby incorporated by reference in its entirety.

FIELD

The field relates generally to tracking systems for adjusting solar arrays or panels and, more specifically, to adjusting the range of motion for solar trackers to avoid ground accumulation.

BACKGROUND

Recently, the development of a variety of energy substitution such as, a clean energy source and environment friendly energy are emerging to replace fossil fuels due to the shortage of fossil fuels, environmental contamination issues, etc. One of the solutions is to use solar energy. This type of solar energy use can be categorized into three types; one of the types converts solar energy to heat energy and uses it for heating or boiling water. The converted heat energy can also be used to operate a generator to generate electric energy. The second type is used to condense sunlight and induce it into fiber optics which is then used for lighting. The third type is to directly convert light energy of the sun to electric energy using solar cells.

Solar trackers are groups of collection devices, such as solar modules. Some solar trackers are configured to follow the path of the sun to minimize the angle of incidence between incoming sunlight and the solar tracker to maximize the solar energy collected. To face the sun correctly, a program or device to track the sun is necessary. This is called a sunlight tracking system or tracking system. The method to track the sunlight can generally be categorized as a method of using a sensor or a method of using a program.

In terms of a power generation system using solar energy, a large number of solar trackers are generally installed on a vast area of flat land and as two modules of solar trackers should not overlap each other, a vast space of land is required. However, some weather conditions, such as snow storms, sandstorms, and flooding may cause potentially dangerous conditions for the solar trackers, especially at the ends of the solar tracker's range of motion.

This Background section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In some aspects, a system is provided. The system includes a tracker attached to a rotational mechanism for changing a plane of the tracker. The tracker is configured to collect solar irradiance. The system also includes a controller in communication with the rotational mechanism. The controller includes at least one processor in communication with at least one memory device. The at least one processor is programmed to store, in the at least one memory device, a plurality of positional and solar tracking information. The at least one processor is also programmed to determine a position of the sun at a first specific point in time. The at least one processor is further programmed to calculate a first angle for the tracker based on the position of the sun and the plurality of positional and solar tracking information. In addition, the at least one processor is programmed to detect an amount of accumulation at the first specific point in time. Moreover, the at least one processor is programmed to determine a first maximum range of motion for the tracker based on the amount of accumulation. Furthermore, the at least one processor is programmed to adjust the first angle for the tracker based on the first maximum range of motion for the tracker. In addition, the at least one processor is also programmed to transmit instructions to the rotational mechanism to change the plane of the tracker to the first adjusted angle.

In other aspects, a method for operating a tracker is provided. The method is implemented by at least one processor in communication with at least one memory device. The method includes storing, in the at least one memory device, a plurality of positional and solar tracking information. The method also includes determining a position of the sun at a first specific point in time. The method further includes calculating a first angle for a tracker based on the position of the sun and the plurality of positional and solar tracking information. In addition, the method includes detecting an amount of accumulation at the first specific point in time. Moreover, the method includes determining a first maximum range of motion for the tracker based on the amount of accumulation. Furthermore, the method includes adjusting the first angle for the tracker based on the first maximum range of motion for the tracker. In addition, the method also includes transmitting instructions to change the plane of the tracker to the first adjusted angle.

In still further aspects, a controller for a tracker is provided. The controller includes at least one processor in communication with at least one memory device. The at least one processor is programmed to store, in the at least one memory device, a plurality of positional and solar tracking information for determining an angle for the tracker based on a position of the sun. The at least one processor is also programmed to determine a position of the sun at a first specific point in time. The at least one processor is further programmed to calculate a first angle for the tracker based on the position of the sun and the plurality of positional and solar tracking information. In addition, the at least one processor is programmed to detect an amount of accumulation at the first specific point in time. Moreover, the at least one processor is programmed to determine a first maximum range of motion for the tracker based on the amount of accumulation. Furthermore, the at least one processor is programmed to adjust the first angle for the tracker based on the first maximum range of motion for the tracker. In addition, the at least one processor is also programmed to transmit instructions to change the plane of the tracker to the first adjusted angle.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the drawings.

DETAILED DESCRIPTION

The systems and processes are not limited to the specific embodiments described herein. In addition, components of each system and each process can be practiced independent and separate from other components and processes described herein. Each component and process also can be used in combination with other assembly packages and processes.

Figure 1:
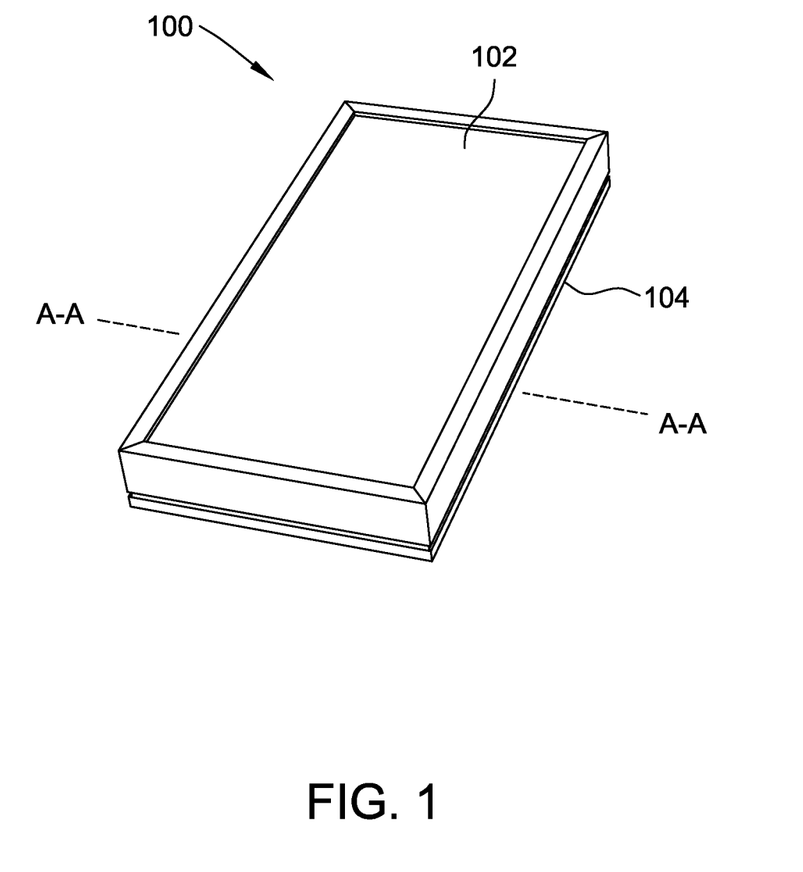
FIG. 1 is a perspective view of a solar module of a solar tracker.
Figure 2:
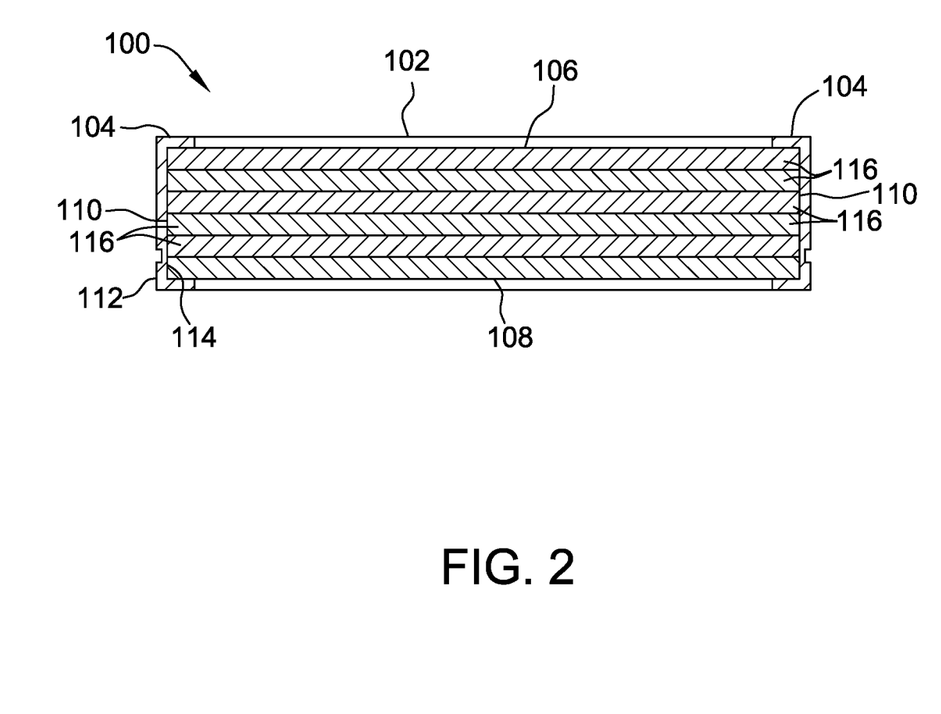
FIG. 2 is a cross-sectional view of the solar module taken along line A-A of FIG. 1.

FIG. 1 is a perspective view of a solar module 100 of a solar tracker. FIG. 2 is a cross-sectional view of the solar module 100 (shown in FIG. 1) taken along line A-A of FIG. 1.

The module 100 includes a top surface 106 and a bottom surface 108. Edges 110 extend between the top surface 106 and the bottom surface 108. Module 100 is rectangular shaped. In other embodiments, module 100 may have any shape that allows the module 100 to function as described herein.

A frame 104 circumscribes and supports the module 100. The frame 104 is coupled to the module 100, for example as shown in FIG. 2. The frame 104 protects the edges 110 of the module 100. The frame 104 includes an outer surface 112 spaced from one or more layers 116 of the module 100 and an inner surface 114 adjacent to the one or more layers 116. The outer surface 112 is spaced from, and substantially parallel to, the inner surface 114. The frame 104 may be made of any suitable material providing sufficient rigidity including, for example, metal or metal alloys, plastic, fiberglass, carbon fiber, and other material capable of supporting the module 100 as described herein. In some embodiments, the frame is made of aluminum, such as 6000 series anodized aluminum.

In the illustrated embodiment, the module 100 is a photovoltaic module. The module 100 has a laminate structure that includes a plurality of layers 116. Layers 116 include, for example, glass layers, non-reflective layers, electrical connection layers, n-type silicon layers, p-type silicon layers, backing layers, and combinations thereof. In other embodiments, the module 100 may have more or fewer layers 116 than shown in FIG. 2, including only one layer 116. The photovoltaic module 100 may include a plurality of photovoltaic modules with each module made of photovoltaic cells.

In some embodiments, the module 100 is a thermal collector that heats a fluid such as water. In such embodiments, the module 100 may include tubes of fluid which are heated by solar radiation. While the present disclosure may describe and show a photovoltaic module, the principles disclosed herein are also applicable to a solar module 100 configured as a thermal collector or sunlight condenser unless stated otherwise.

Figure 3:
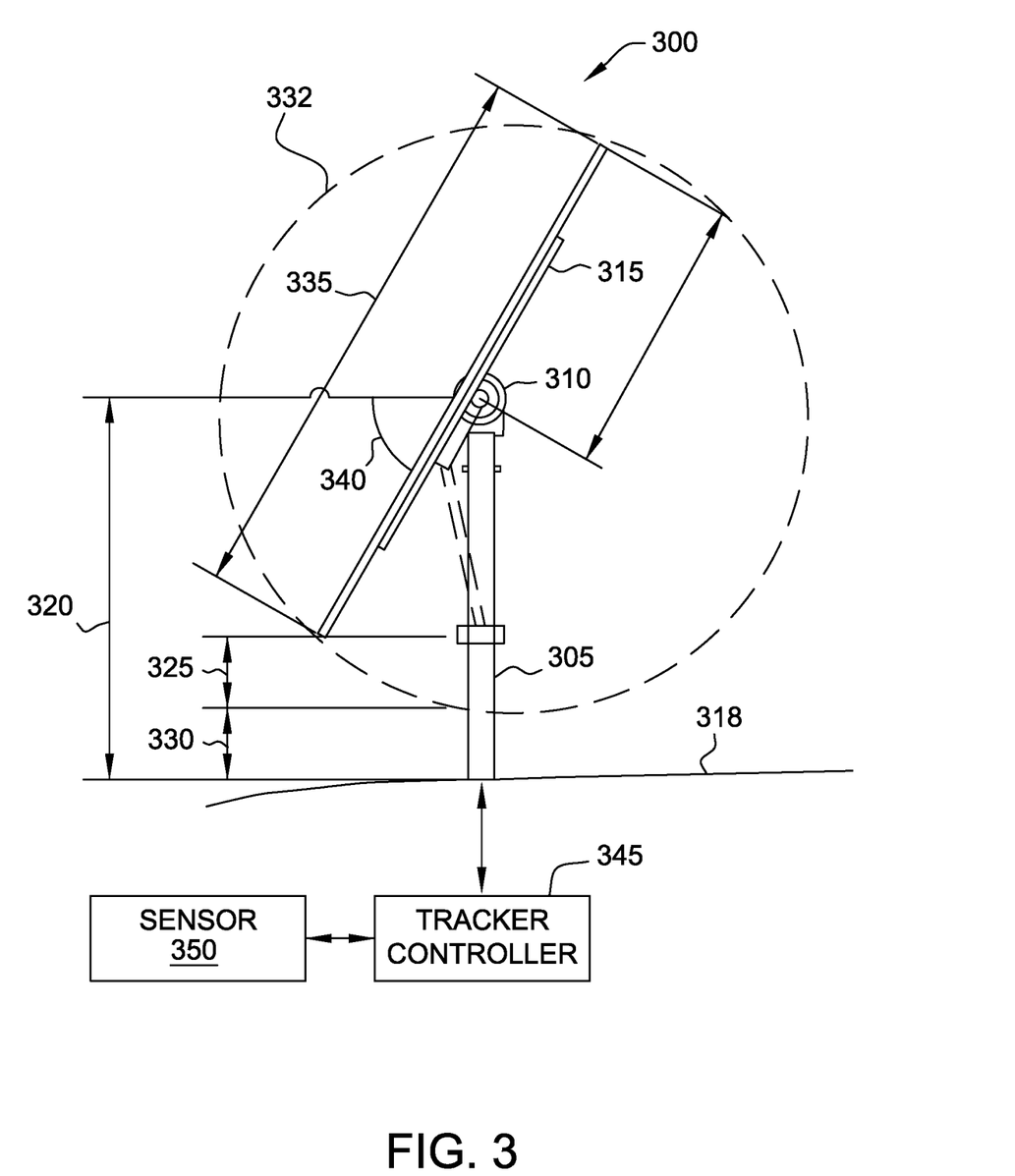
FIG. 3 is a side view of a solar tracker in an example of the present disclosure.

FIG. 3 is a side view of a tracker 300 in accordance with at least one embodiment. The tracker 300 includes support columns 305, one or more rotational mechanisms 310, and a tracker panel 315. The tracker panel 315 includes from one to a plurality of modules 100 (shown in FIG. 1). The tracker 300 (also known as a tracker row) controls the position of the plurality of modules 100 on the tracker panel 315. The rotational mechanism 310 is configured to rotate the tracker panel 315 to different angles θ 340 to track the sun as described herein. The tracker controller 345 transmits instructions to the rotational mechanism 310 to change the plane of the tracker 300. As used herein the plane of the tracker 300 is the top surface 106 (shown in FIG. 2) of the tracker panel 315 (shown in FIG. 3). The rotational mechanism 310 rotates the tracker panel 315 along a single axis where a range of motion 332 for the tracker panel 315 can include angles θ 340 from −60 degrees to 60 degrees, where zero degrees is horizontal. Rotational mechanism 310 can be any rotational mechanism 310 able to move the tracker panel 315 between angles θ 340 as described herein. In FIG. 3, the tracker panel 315 is at −60 degrees. The rotational mechanism 310 can be capable of moving a single tracker panel 315, an entire row of tracker panels 315, or a group of tracker panels 315. In some embodiments, each tracker 300 is associated with its own rotational mechanism 310. The rotational mechanism 310 can include, but is not limited to, linear actuators and slew drives.

Tracker 300 is configured so that the top of the tracker 300 (measured at the top of the support column 305) is positioned a height h 320 above the ground 318. The height h 320 is configured so that the tracker panel 315 of the tracker 300 does not touch the ground 318 while traversing the range of motion 332. To ensure that the tracker panel 315 does not touch the ground 318 at the ends of the range of motion 332, the height h 320 also includes a safety margin g 325. Safety margin g 325 ensures that the tracker panel 315 of the tracker 300 does not reach the ground 318 when at the extremes of its range of motion 332.

In many solar assemblies, when there is an accumulation on the ground 318, the tracker panel 315 of the tracker 300 is placed in the horizontal position until the accumulation is removed. The accumulation can include, but is not limited to, water, such as from flooding, snow, and sand. However, keeping the tracker panel 315 at a horizontal position is not efficient for generating power. Furthermore while in the horizontal position, the tracker panel 315 can also accumulate snow or sand, which then would cover up the modules 100 of the tracker panel 315 and prevent the tracker 300 from working to collect solar irradiance. Furthermore, significant amounts of accumulation on the tracker panel 315 of the tracker 300 in the horizontal position can overload the structure and cause damage to the tracker panel 315, the support column 305, and/or the rotational mechanism 310, for example.

The tracker 300 is in communication with a tracker controller 345. The tracker controller 345 instructs the tracker 300 at which angle θ 340 to position the tracker panel 315. The tracker controller 345 is programmed to determine the position of the sun and calculate the corresponding angle θ 340 of the tracker panel 315 in this embodiment. The tracker controller 345 is programmed to ensure that the angle θ 340 of the tracker panel 315 is within the range of motion 332. The tracker controller 345 can be in communication with and in control of a single tracker 300 or a plurality of trackers 300. The tracker controller 345 can be in communication with and in control of all of the trackers 300 in a row of trackers 300.

For each tracker 300, the tracker controller 345 provides solar tracking to maximize the solar irradiance collected by the tracker 300. The tracker controller 345 determines the sun's position with respect to the center of the tracker 300. The tracker controller 345 stores the latitude, longitude, and altitude of the tracker 300. In at least one embodiment, the tracker controller 345 uses the National Renewable Energy Lab's (NREL) equations to calculate the sun's position at any given point in time. In alternative embodiments, the tracker controller 345 is in communication with one or more sensors 350 capable of determining the sun's current position. The tracker controller 345 is programmed to maximize the energy yield for the tracker 300 by minimizing the angle between the sun vector and the normal vector of the plane of the tracker panel 315.

The tracker controller 345 instructs the rotational mechanism 310 to adjust the plane of the tracker panel 315 to be at angle θ 340, so that the plane of the tracker panel 315 does not deviate by more than +/−1 while tracking the sun. In some embodiments, the tracker controller 345 provides a step size to the angle θ 340 of the plane of the tracker panel 315 of two degrees. This means that the tracker controller 345 adjusts the plane of the tracker panel 315 for every two degrees the sun moves. The tracker controller 345 can adjust the angle θ 340 of the plane of the tracker panel 315 by any amount, limited by the mechanical tolerances of the tracker 300 and the rotational mechanism 310. In some embodiments, the tracker controller 345 instructs the rotational mechanisms 310 to adjust each tracker panel 315 individually, where different tracker panels 315 in the same row may be adjusted to different angles θ 340. In other embodiments, the tracker controller 345 instructs that all of the tracker panels 315 in a row should be adjusted to the same angle θ 340. In some further embodiments, the tracker controller 345 may transmit instructions to trackers 300 in different rows. For example, a tracker controller 345 may control trackers 300 in two adjacent rows.

During conditions where there is accumulation on the ground 318, the tracker controller 345 can restrict the range of motion 332 of the tracker 300 to prevent the tracker panel 315 from being damaged. In these conditions, the tracker controller 345 determines the current amount (or depth) of accumulation s 330. The tracker controller 345 can determine the current amount of accumulation s 330 from sensor 350. The sensor 350 can be associated with the individual tracker 300 or a group of trackers 300. The sensor 350 is capable of detecting the current amount of accumulation s 330. The sensor 350 can be, but is not limited to, a snow sensor capable of determining the current amount of snowfall on the ground 318, a snow gauge, a sand gauge, an optical sensor capable of reading known markings to determine the depth of the accumulation, or any other sensor 350 that allows the tracker 300 to work as described herein. The tracker controller 345 can also receive the amount of accumulation s 330 from a remote computer device.

The tracker controller 345 restricts the range of motion 332 of the tracker panel 315 of the tracker 300 to prevent the tracker panel 315 or any other part of the tracker 300 from becoming damaged while still providing solar tracking to maximize solar irradiance collected. The tracker controller 345 can use the following equation to determine the maximum angle θ 340 for the tracker panel 315.

$$\theta = \sin^{-1}\left(\frac{h-s-g}{\frac{w}{2}}\right) \qquad \text{EQ. 1}$$

where θ is the absolute value of the maximum angle θ 340, h is the height h 320 of the tracker 300 at the top of the support column 305, g is the safety margin g 330, s is the amount of the accumulation s 330, and w is the width w 335 of the tracker panel 315 along the direction that the tracker panel 315 rotates. The tracker controller 345 sets the range of motion 332 based on the calculated maximum angle θ 340.

The tracker controller 345 tracks the sun to know its position with respect to the center of the tracker 300. The tracker controller 345 can determine the center to be the center of an individual tracker 300, the center of a plurality of rows of trackers 300 (also known as an array), and the center of an entire site of trackers 300. To calculate the sun's position, the tracker controller 345 takes into account latitude, longitude, altitude, the exact date and time, and other parameters. The tracker controller 345 can determine the sun's current position or the sun's position a point in time in the future. The tracker controller 345 uses position of the sun to determine an angle θ 340 where the normal vector of the tracker panel 315 will be as close as possible to the sun's vector. The tracker controller 345 is programmed to adjust the tracker panel 315 when the sun has moved 2 degrees; therefore, the tracker controller 345 calculates the angle θ 340 for the tracker panel 315 to be where the angle θ 340 is closest to the solar vector for the time between adjustments. For example, if the sun vector is at −37 degrees and the sun is rising, the tracker controller 345 can adjust the tracker panel 315 to be at −36 degrees. This provides the maximum coverage while the sun travels from −37 degrees to −35 degrees. In other examples, the tracker controller 345 is programmed to adjust the tracker panel 315 when a predetermined period of time has passed.

During the span of a day, the tracker panel 315 rotates, while following the sun, from −60 degrees to 60 degrees. However, in some situations, where there is accumulation on the ground 318, the tracker panel 315 might not be able to safely traverse the entire range of motion 332, −60 to 60 degrees.

Figure 4:
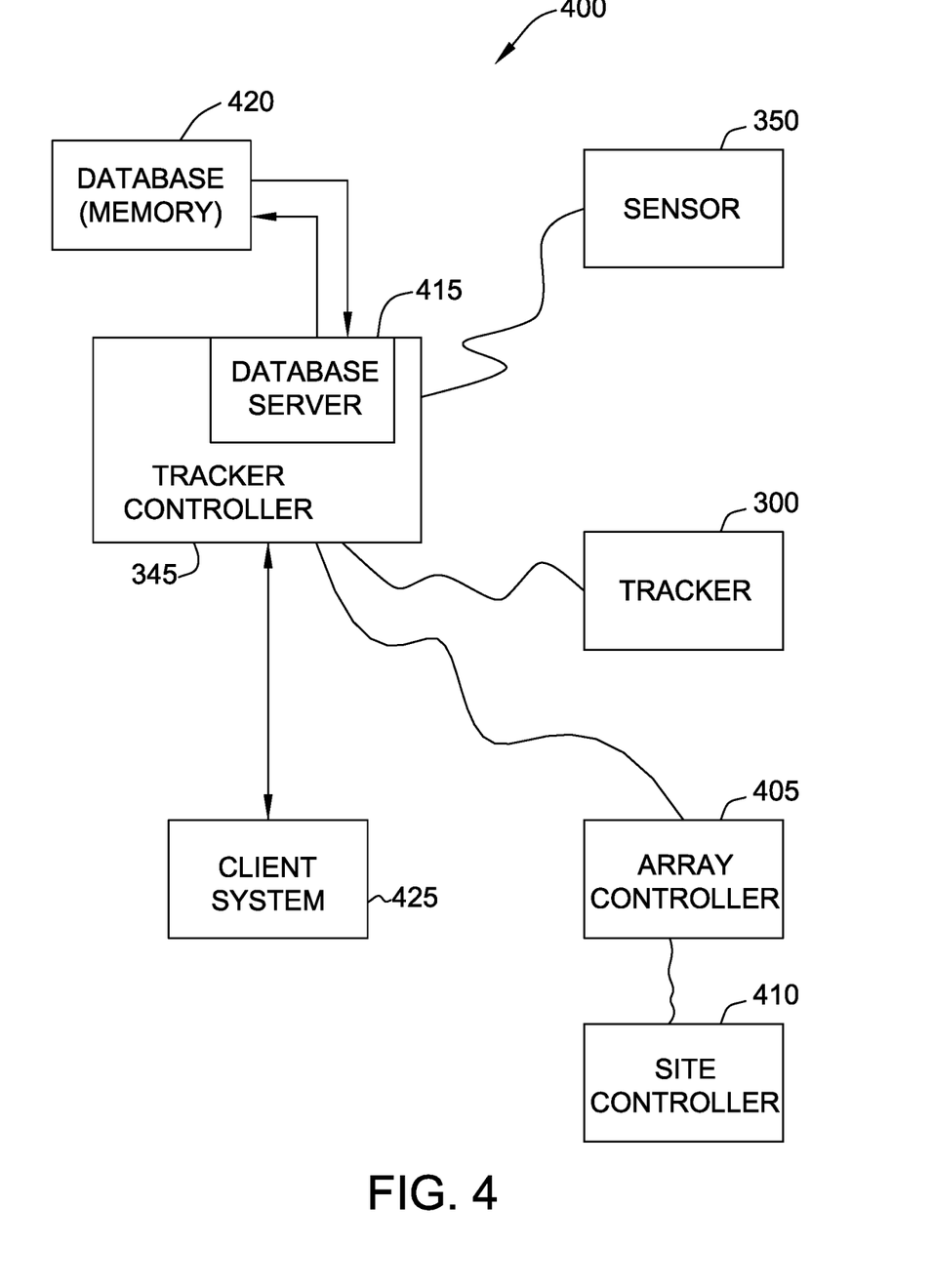
FIG. 4 illustrates an example system for performing adaptive range of motion for the solar tracker example shown in FIG. 3.

FIG. 4 illustrates an example system 400 for performing adaptive range of motion 332 for the solar tracker 300 (both shown in FIG. 3), in accordance with one example of the present disclosure. In the example, the system 400 is used for controlling trackers 300. The system 400 is a tracker controlling computer system that includes at least one tracker controller 345 configured to control the angle θ 340 of the tracker panel 315 (both shown in FIG. 4) of a tracker 300. In some examples, the tracker controller 345 is programmed to control a plurality of trackers 300 based on data received from one or more sensors 350.

Trackers 300 are configured to track the position of the sun to collect solar irradiance. As described herein, trackers 300 are associated with a rotational mechanism 310 which rotates the tracker panel 315 (both shown in FIG. 3) of modules 100 (shown in FIG. 1) to track the position of the sun. The tracker controller 345 ensures that the tracker panel 315 is only positioned at angles θ 340 within the range of motion 332 for that tracker. During periods of accumulation, the tracker controller 345 determines the maximum angle θ 340 for the range of motion 332 for the tracker panel 315 may be turned to during solar tracking using Equation 1.

In system 400, sensors 350 receive signals about the conditions around the tracker 300. The sensors 350 can include, but are not limited to, a snow sensor capable of determining the current amount of snowfall on the ground, a snow gauge, a sand gauge, an optical sensor capable of reading known markings to determine the depth of the accumulation, or any other sensor 350 that allows the tracker 300 to work as described herein. The sensors 350 can also include an optical sensor for detecting the current position of the sun. Sensors 350 connect to tracker controller 345 through various wired or wireless interfaces including without limitation a network, such as a local area network (LAN) or a wide area network (WAN), dial-in-connections, cable modems, Internet connection, wireless, and special high-speed Integrated Services Digital Network (ISDN) lines. Sensors 350 receive data about the current conditions at the location of the tracker 300. The sensors 350 can be associated with individual trackers 300, an entire row of trackers 300, an entire array of trackers 300, and/or an entire site. In other examples, sensors 350 are in communication with an array controller 405 and/or a site controller 410, and the sensor information or data describing the sensor information is thereby transmitted to the tracker controller 345.

Array controllers 405 are computers that include a web browser or a software application, which enables array controller 405 to communicate with one or more of tracker controller 345, another array controller 405, and site controller 410 using the Internet, a local area network (LAN), or a wide area network (WAN). In some examples, the array controllers 405 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Array controllers 405 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. Array controllers 405 are computing devices for monitoring a plurality of tracker controllers 345 in communication with a plurality of trackers 300.

Site controllers 410 are computers that include a web browser or a software application, which enables site controller 410 to communicate with one or more of tracker controller 345, array controller 405, and client system 425 using the Internet, a local area network (LAN), or a wide area network (WAN). In some examples, the site controllers 410 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Site controllers 410 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. Site controllers 410 are computing devices for monitoring a plurality of array controllers 405, which are each in communication with a plurality of tracker controllers 345. The site controller 410 and/or the array controller 405 can provide information to the tracker controller 345 such as, but not limited to, weather information, forecast information, sun position information, and other information to allow the tracker controller 345 to operate as described herein.

Client systems 425 are computers that include a web browser or a software application, which enables client systems 425 to communicate with one or more of tracker controller 345, array controller 405, and site controller 410 using the Internet, a local area network (LAN), or a wide area network (WAN). In some examples, the client systems 425 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client systems 425 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. Client system 425 can provide information to the tracker controller 345 such as, but not limited to, current accumulation amounts.

A database server 415 is communicatively coupled to a database 420 that stores data. In one example, the database 420 is a database that includes, but is not limited to, the latitude, longitude, and altitude of the site, the current time, range of motion 332, and the current sun position based on the exact date, time, latitude, longitude, altitude, and other parameters. In some examples, the database 420 is stored remotely from the tracker controller 345. In some examples, the database 420 is decentralized. In the example, a person can access the database 420 via the client system 425 by logging onto one of tracker controller 345, array controller 405, and site controller 410.

Figure 5:
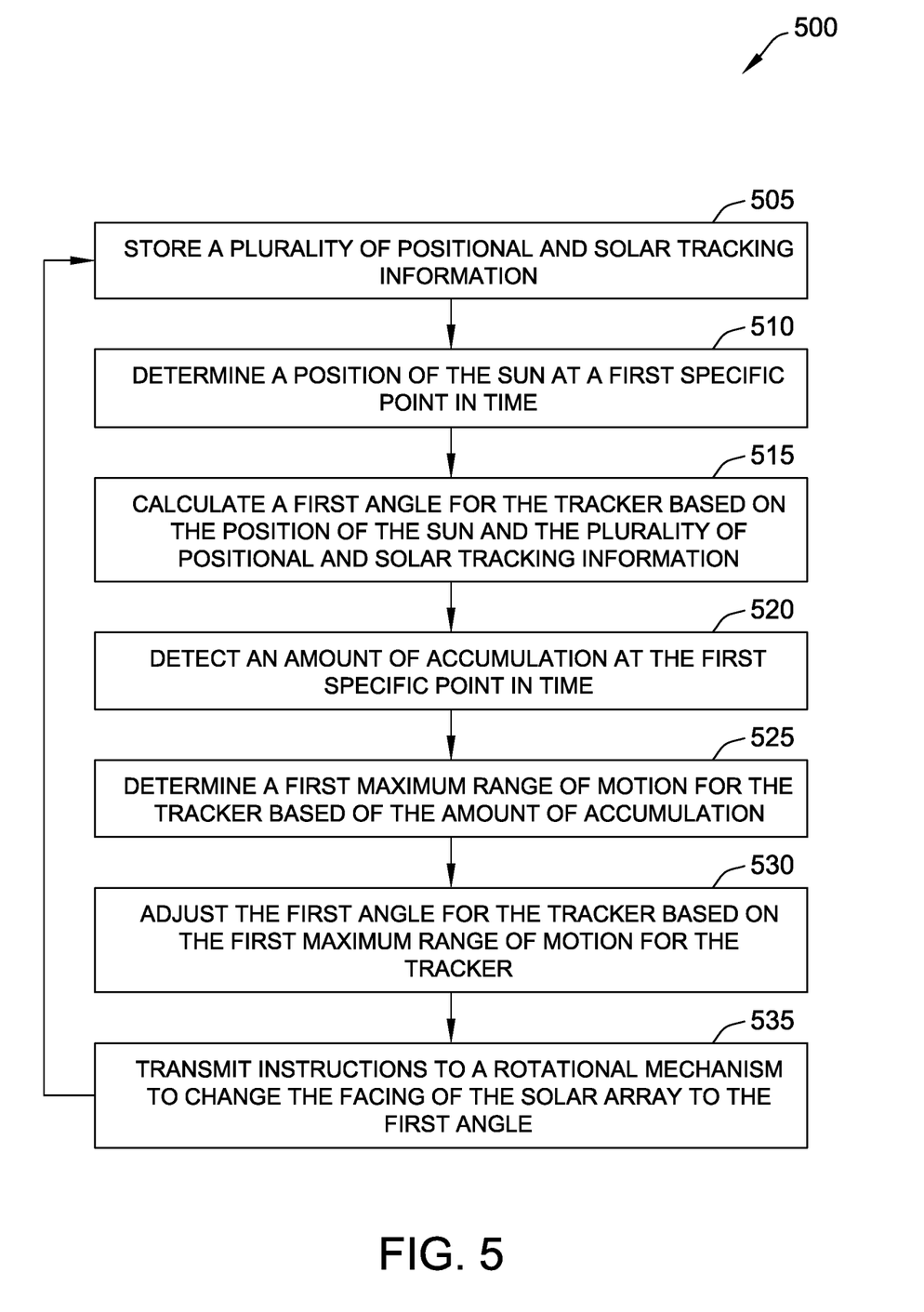
FIG. 5 illustrates an example process for performing adaptive range of motion for the solar tracker shown in FIG. 3 using the system shown in FIG. 4.

FIG. 5 illustrates an example process 500 for performing adaptive range of motion 332 for the solar tracker 300 (both shown in FIG. 3) using the system 400 (shown in FIG. 4). In this embodiment, process 500 is performed by the tracking controller 345 (shown in FIG. 3). Process 500 includes steps to ensure that the range of motion 332 of the tracker 300 remains clear of any accumulation on the ground 318 (shown in FIG. 3).

The tracker controller 345 stores 505 a plurality of positional and solar tracking information in at least one memory device, such as database 420 (shown in FIG. 4). This information can include, but is not limited to, the latitude, longitude, and altitude of the site, the current time, range of motion 332, and the sun position based on exact date, time, latitude, longitude, and altitude. The tracker controller 345 determines 510 a position of the sun at a first specific point in time. The tracker controller 345 calculates 515 a first angle 340 (shown in FIG. 3) for the tracker 300 based on the position of the sun and the plurality of positional and solar tracking information.

The tracker controller 345 detects 520 an amount of accumulation s 330 (shown in FIG. 3) at the first specific point in time. The amount of accumulation s 330 can be received from one or more sensors 350 (shown in FIG. 3) or a remote computer device, such as, array controller 405, site controller 410, and client system 425.

The tracker controller 345 determines 525 a first maximum range of motion 332 for the tracker 300 based on the amount of accumulation s 330. The tracker controller 345 stores a tracker maximum range of motion 332, the tracker maximum range of motion 332 is from −60 degrees to 60 degrees. The tracker controller 345 determines 525 the first maximum range of motion 332 based on a height h 320 of the tracker 300, the amount of accumulation s 330, a safety margin g 325, and a width w 335 (all shown in FIG. 3 of the tracker 300. The first maximum range of motion 332 is more restrictive than the tracker maximum range of motion 332. For example, the maximum range of motion 332 is −60 degree to 60 degree, while the first maximum range of motion 332 is −56 degree to 56 degrees due to the amount accumulation s 330 on the ground 318.

The tracker controller 345 adjusts 530 the first angle 340 for the tracker 300 based on the first maximum range of motion 332 for the tracker 300. The tracker controller 345 compares the first angle 340 to the first maximum range of motion 332 to determine if the first angle 340 exceeds the first maximum range of motion 332. If the first angle 340 does exceed the first maximum range of motion 332, the tracker controller 345 adjusts 530 the first angle 340 to be within the first maximum range of motion 332. For example, if the first maximum range of motion 332 is −47 to 47 degrees and the first angle 340 is 55 degrees, the first angle 340 is adjusted 530 to 47 degrees to be within the first maximum range of motion 332, while still having the normal vector of the tracker panel 315 as close as possible to the vector of the sun. If the first angle 340 is −30 degrees, then the tracker controller 345 does not adjust the first angle 340.

The tracker controller 345 transmits 535 instructions to the rotational mechanism 310 (shown in FIG. 3) to change the plane of the tracker 300 to the first adjusted angle 340. As used herein the plane of the tracker 300 is the top surface 106 (shown in FIG. 2) of the tracker panel 315 (shown in FIG. 3).

The tracker controller 345 determines a second position of the sun at a second specific point in time. The tracker controller 345 calculates a second angle 340 for the tracker 300 based on the position of the sun and the plurality of positional and solar tracking information. The tracker controller 345 detects a second amount of accumulation s 330 at the second specific point in time. The tracker controller 345 determines a second maximum range of motion 332 for the tracker 300 based on the second amount of accumulation s 330. The tracker controller 345 adjusts the second angle 340 for the tracker 300 based on the second maximum range of motion 332 for the tracker 300. The tracker controller 345 transmits instructions to the rotational mechanism 310 to change the plane of the tracker 300 to the second adjusted angle 340. For example, at a later point in time the amount of accumulation s 330 has changed (either increased or decreased), then the tracker controller 345 updates the range of motion 332 for the tracker 300 based on the new amount of accumulation s 330. The tracker controller 345 is constantly repeating Steps 505 to 535 to ensure that the tracker panel 315 is kept clear of the accumulation on the ground 318.

The tracker controller 345 also repeats steps 505 to 535 to change the plane of the tracker 300 once the sun 315 has moved a predetermined amount. The tracker controller 345 determines if a difference between the position of the sun and the second position of the sun exceeds a predetermined threshold. This can be based on a change in angle of the sun or after a specific amount of time has passed. If the difference exceeds the predetermined threshold, the tracker controller 345 transmits instructions to the rotational mechanism 310 to change the plane of the tracker 300 to the second adjusted angle.

The tracker controller 345 can also determine if the amount of accumulation s 330 has changed over time. The tracker controller 345 can detect a second amount of accumulation s 330 at a second specific point in time. The tracker controller 345 determines a second maximum range of motion 332 for the tracker 300 based on the second amount of accumulation s 330. The tracker controller 345 adjusts the first angle 340 for the tracker 300 based on the second maximum range of motion 332 for the tracker 300. The tracker controller 345 transmits instructions to the rotational mechanism 310 to change the plane of the tracker 300 to the first adjusted angle 340. The tracker controller 345 also instructs the rotational mechanism 310 to change the plane of the tracker 300 to be horizontal when the amount of accumulation s 330 exceeds the height h 320 of the tracker 300 minus the safety margin g 325.

In some embodiments, the tracker controller 345 is in communication with a plurality of trackers 300 and instructs every tracker 300 in the plurality of trackers 300 to the first angle 340. Each tracker 300 of the plurality of trackers 300 includes a rotational mechanism 310 and the tracker controller 345 transmits instructions to each of the plurality of rotational mechanisms 310 to change the plane of the corresponding tracker 300 to the first angle 340. In alternative embodiments, the rotational mechanism 310 is attached to each tracker 300 of the plurality of trackers 300 and the tracker controller 345 instructs the rotational mechanism 310 to change the plane of the plurality of trackers 300 to the first angle 340.

Process 500 can be performed dynamically in real time. Portions of process 500 can also be performed in advance. For example, tracker controller 345 can determine all of the angles 340 for a day based on knowing where the sun will be positioned at each moment in the day. Then tracker controller 345 can adjust 530 the angle for each moment of the day based on the amount of accumulation s 330 that exists at that moment of the day and how the range of motion 332 has changed for that tracker 300. One or more of the steps of process 500 can also be performed by site controller 410, array controller 405, and/or other computer devices and the results can be provided to the tracker controller 345 to know when to adjust the tracker 300 and what angle to adjust the tracker 300 to.

Figure 6:
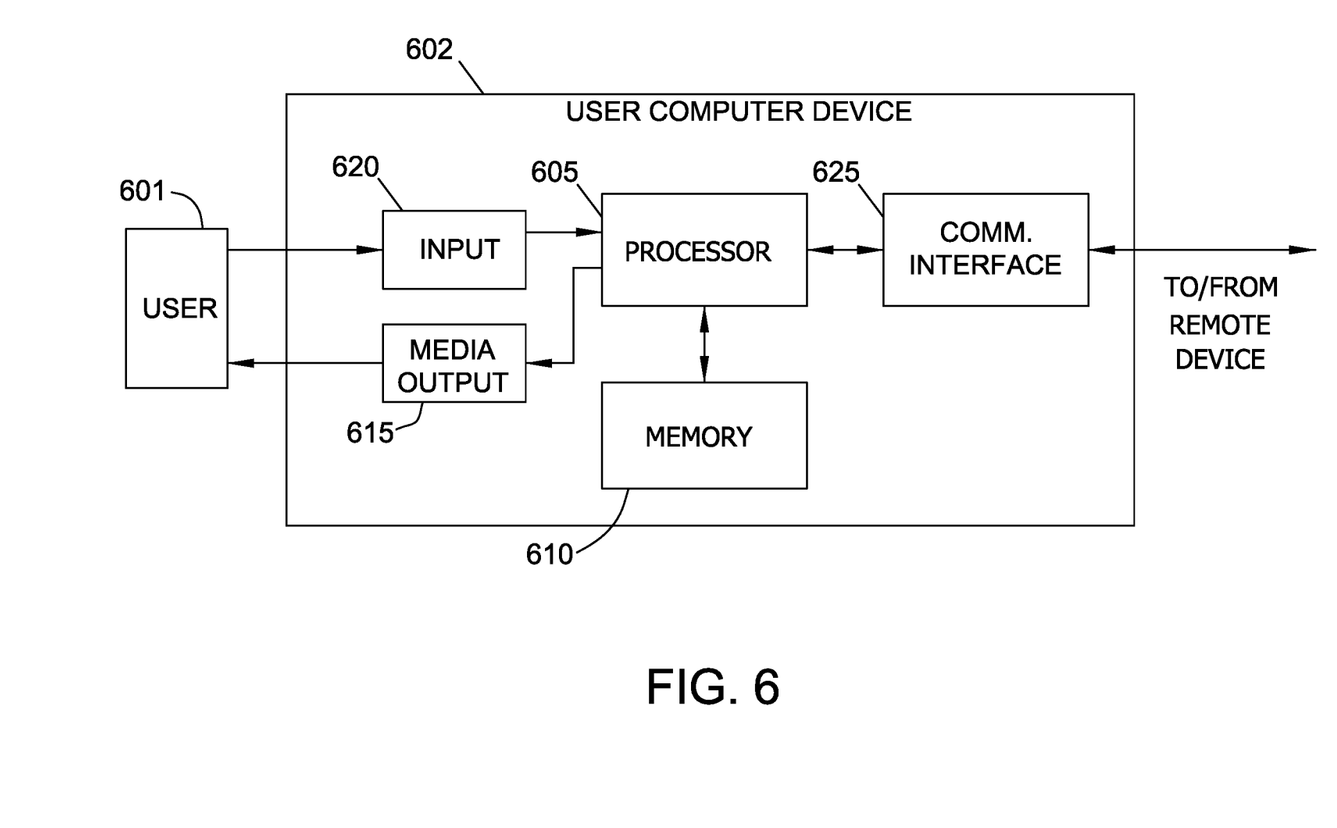
FIG. 6 illustrates an example configuration of a user computer device used to perform the process shown in FIG. 5.

FIG. 6 illustrates an example configuration of a user computer device 602 used to perform the process 500 (shown in FIG. 5). User computer device 602 is operated by a user 601. The user computer device 602 can include, but is not limited to, the tracker controller 345, sensor 350 (both shown in FIG. 3), the array controller 405, the site controller 410, and the client system 424 (all shown in FIG. 4). The user computer device 602 includes a processor 605 for executing instructions. In some examples, executable instructions are stored in a memory area 610. The processor 605 can include one or more processing units (e.g., in a multi-core configuration). The memory area 610 is any device allowing information such as executable instructions and/or transaction data to be stored and retrieved. The memory area 610 can include one or more computer-readable media.

The user computer device 602 also includes at least one media output component 615 for presenting information to the user 601. The media output component 615 is any component capable of conveying information to the user 601. In some examples, the media output component 615 includes an output adapter (not shown) such as a video adapter and/or an audio adapter. An output adapter is operatively coupled to the processor 605 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some examples, the media output component 615 is configured to present a graphical user interface (e.g., a web browser and/or a client application) to the user 601. A graphical user interface can include, for example, an interface for viewing the performance information about a tracker 300 (shown in FIG. 3). In some examples, the user computer device 602 includes an input device 620 for receiving input from the user 601. The user 601 can use the input device 620 to, without limitation, select to view the performance of a tracker 300. The input device 620 can include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen can function as both an output device of the media output component 615 and the input device 620.

The user computer device 602 can also include a communication interface 625, communicatively coupled to a remote device such as the site controller 410. The communication interface 625 can include, for example, a wired or wireless network adapter and/or a wireless data transceiver for use with a mobile telecommunications network.

Stored in the memory area 610 are, for example, computer-readable instructions for providing a user interface to the user 601 via the media output component 615 and, optionally, receiving and processing input from the input device 620. A user interface can include, among other possibilities, a web browser and/or a client application. Web browsers enable users, such as the user 601, to display and interact with media and other information typically embedded on a web page or a website from the tracker controller 345. A client application allows the user 601 to interact with, for example, the tracker controller 345. For example, instructions can be stored by a cloud service, and the output of the execution of the instructions sent to the media output component 615.

The processor 605 executes computer-executable instructions for implementing aspects of the disclosure. In some examples, the processor 605 is transformed into a special purpose microprocessor by executing computer-executable instructions or by otherwise being programmed. For example, the processor 605 is programmed with instructions such as those shown in FIG. 5.

Figure 7:
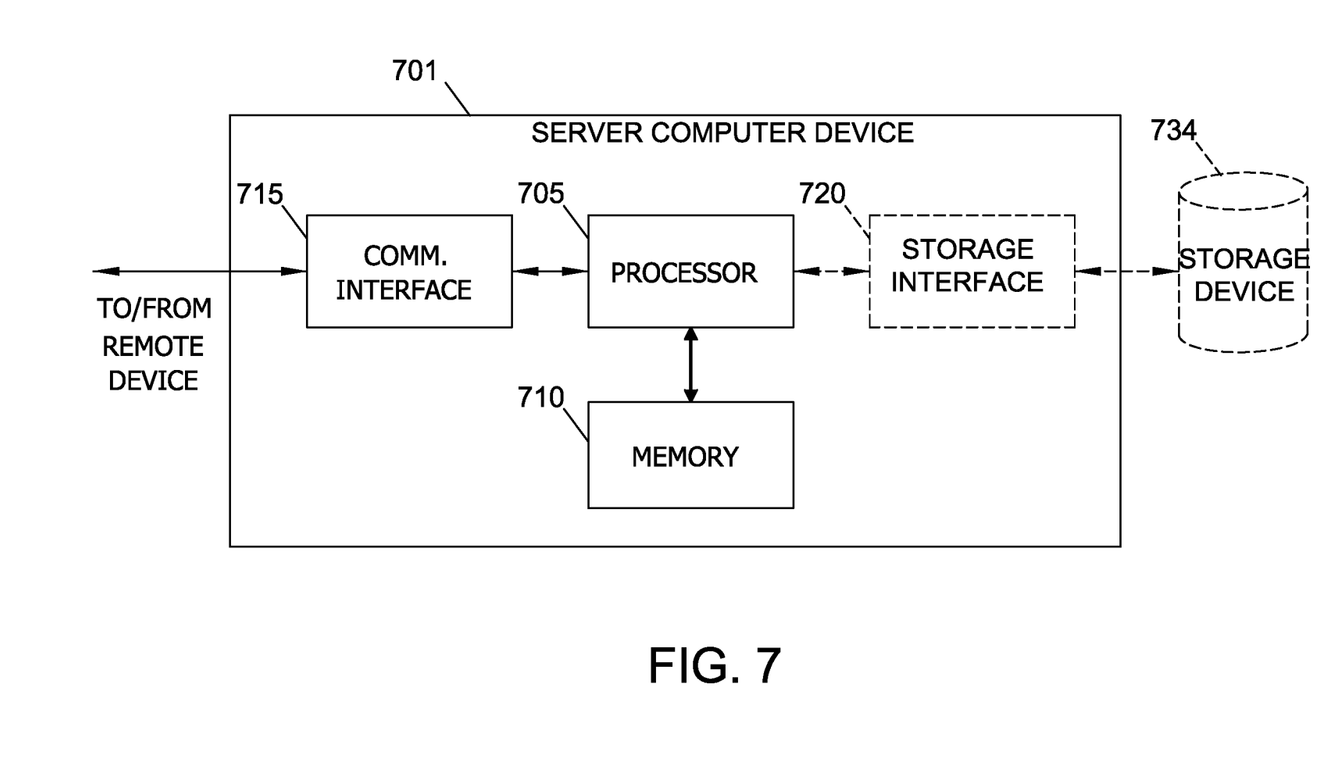
FIG. 7 illustrates an example configuration of the server system used to perform the process shown in FIG. 5.

FIG. 7 illustrates an example configuration of the server system used to perform the process 500 (shown in FIG. 5. Server computer device 701 can include, but is not limited to, the tracker controller 345 (shown in FIG. 3), the array controller 405, the site controller 410, and the database server 415 (all shown in FIG. 4). The server computer device 701 also includes a processor 705 for executing instructions. Instructions can be stored in a memory area 710. The processor 705 can include one or more processing units (e.g., in a multi-core configuration).

The processor 705 is operatively coupled to a communication interface 715 such that the server computer device 701 is capable of communicating with a remote device such as another server computer device 701, another tracker controller 345, or the client system 425 (shown in FIG. 4).

For example, the communication interface 715 can receive requests from the client system 425 via the Internet, as illustrated in FIG. 4.

The processor 705 can also be operatively coupled to a storage device 734. The storage device 734 is any computer-operated hardware suitable for storing and/or retrieving data, such as, but not limited to, data associated with the database 420 (shown in FIG. 4). In some examples, the storage device 734 is integrated in the server computer device 701. For example, the server computer device 701 may include one or more hard disk drives as the storage device 734. In other examples, the storage device 734 is external to the server computer device 701 and may be accessed by a plurality of server computer devices 701. For example, the storage device 734 may include a storage area network (SAN), a network attached storage (NAS) system, and/or multiple storage units such as hard disks and/or solid state disks in a redundant array of inexpensive disks (RAID) configuration.

In some examples, the processor 705 is operatively coupled to the storage device 734 via a storage interface 720. The storage interface 720 is any component capable of providing the processor 705 with access to the storage device 734. The storage interface 720 can include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 705 with access to the storage device 734.

The processor 705 executes computer-executable instructions for implementing aspects of the disclosure. In some examples, the processor 705 is transformed into a special purpose microprocessor by executing computer-executable instructions or by otherwise being programmed. For example, the processor 705 is programmed with instructions such as those shown in FIG. 5.

Described herein are computer systems such as the tracker controller and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers; reduced instruction set circuits (RISC), application-specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer-readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The methods and system described herein may be implemented using computer programming or engineering techniques including computer software, firmware, hardware, or any combination or subset. As disclosed above, at least one technical problem with prior systems is that there is a need for systems for a cost-effective and reliable manner for determining a direction of arrival of a wireless signal. The system and methods described herein address that technical problem. Additionally, at least one of the technical solutions to the technical problems provided by this system may include: (i) improved accuracy in determining proper angles for solar trackers, (ii) reduced chance of damage to the tracker due to the amount of accumulation on the ground; (iii) increased solar irradiance collected during weather periods with accumulation; (iv) up-to-date positioning of solar trackers based on current conditions at the solar site; and (v) reduced downtime for trackers based on weather conditions.

The methods and systems described herein may be implemented using computer programming or engineering techniques including computer software, firmware, hardware, or any combination or subset thereof, wherein the technical effects may be achieved by performing at least one of the following steps: a) store, in the at least one memory device, a plurality of positional and solar tracking information; b) determine a position of the sun at a first specific point in time; c) calculate a first angle for the tracker based on the position of the sun and the plurality of positional and solar tracking information; d) detect an amount of accumulation at the first specific point in time; e) determine a first maximum range of motion for the tracker based on the amount of accumulation; f) adjust the first angle for the tracker based on the first maximum range of motion for the tracker; g) transmit instructions to the rotational mechanism to change the plane of the tracker to the first adjusted angle; h) determine a second position of the sun at a second specific point in time; i) calculate a second angle for the tracker based on the position of the sun and the plurality of positional and solar tracking information; j) detect a second amount of accumulation at the second specific point in time; k) determine a second maximum range of motion for the tracker based on the second amount of accumulation; l) adjust the second angle for the tracker based on the second maximum range of motion for the tracker; m) transmit instructions to the rotational mechanism to change the plane of the tracker to the second adjusted angle; o) determine if a difference between the position of the sun and the second position of the sun exceeds a predetermined threshold; p) if the difference exceeds the predetermined threshold, transmit instructions to the rotational mechanism to change the plane of the tracker to the second adjusted angle; q) determine if the first angle exceeds the first maximum range of motion; r) adjust the first angle to be within the first maximum range of motion; s) detect a second amount of accumulation at a second specific point in time; t) determine a second maximum range of motion for the tracker based on the second amount of accumulation; u) adjust the first angle for the tracker based on the second maximum range of motion for the tracker; v) transmit instructions to the rotational mechanism to change the plane of the tracker to the first adjusted angle; w) store a tracker maximum range of motion; v) determine the first maximum range of motion based on a height of the tracker, the amount of accumulation, a safety margin, and a width of the tracker, wherein the first maximum range of motion is more restrictive than the tracker maximum range of motion, wherein the tracker maximum range of motion is from −60 degrees to 60 degrees, and wherein the tracker includes a tracker panel with a plurality of modules, wherein the rotational mechanism changes the plane of the tracking panel; and w) instruct the rotational mechanism to change the plane of the tracker to be horizontal when the amount of accumulation exceeds the height of the tracker minus the safety margin.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a tracker attached to a rotational mechanism for changing a plane of the tracker, wherein the tracker is configured to collect solar irradiance; and
a controller in communication with the rotational mechanism, the controller comprising at least one processor in communication with at least one memory device, wherein the at least one processor is programmed to:
detect a height of accumulation of material on the ground at a first point in time;
calculate a first maximum range of motion for the tracker based on the height of accumulation of material on the ground at the first point in time, wherein the tracker will not intersect with the height of material on the ground within the first maximum range of motion;
determine a first angle for the tracker within the first maximum range of motion; and
change the plane of the tracker to the first angle.

2. The system in accordance with claim 1, wherein the at least one processor is further programmed to:
store, in the at least one memory device, a plurality of positional and solar tracking information;
determine a position of the sun at the first point in time; and
calculate the first angle for the tracker based on the position of the sun and the plurality of positional and solar tracking information.

3. The system in accordance with claim 2, wherein the at least one processor is further programmed to adjust the first angle to be within the first maximum range of motion for the tracker.

4. The system in accordance with claim 1, wherein the at least one processor is further programmed to maximize the energy yield for the tracker by minimizing the angle between the sun vector and the normal vector of the plane of the tracker.

5. The system in accordance with claim 2, wherein the at least one processor is further programmed to:
determine a position of the sun at a second point in time;
calculate a second angle for the tracker based on the position of the sun at the second point in time;
detect a second height of accumulation of material on the ground at the second point in time;
determine a second maximum range of motion for the tracker based on the second height of accumulation of material on the ground, wherein the tracker will not intersect with the second height of material on the ground within the second maximum range of motion;
adjust the second angle for the tracker based on the second maximum range of motion for the tracker to generate a second adjusted angle, wherein the second adjusted angle is within the second maximum range of motion for the tracker; and
change the plane of the tracker to the second adjusted angle.

6. The system in accordance with claim 5, wherein the at least one processor is further programmed to:
determine if a difference between the position of the sun at the first point in time and the position of the sun at the second point in time exceeds a predetermined threshold; and
if the difference exceeds the predetermined threshold, change the plane of the tracker to the second adjusted angle.

7. The system in accordance with claim 1, the at least one processor is further programmed to:
determine a position of the sun at a second point in time;
calculate a second angle for the tracker based on the position of the sun at the second point in time, wherein the second angle is within the first maximum range of motion for the tracker; and
change the plane of the tracker to the second angle.

8. The system in accordance with claim 1, wherein the at least one processor is further programmed to:
detect a second height of accumulation of material on the ground at a second point in time;
determine a second maximum range of motion for the tracker based on the second height of accumulation of material on the ground, wherein the tracker will not intersect with the second height of material on the ground within the second maximum range of motion; and
adjust the first angle for the tracker based on the second maximum range of motion for the tracker to generate a new first adjusted angle; and
change the plane of the tracker to the new first adjusted angle.

9. The system in accordance with claim 1, wherein the at least one processor is further programmed to:
store a tracker maximum range of motion; and
determine the first maximum range of motion based on a height of the tracker, the height of accumulation of material on the ground, a safety margin, and a width of the tracker, wherein the first maximum range of motion is more restrictive than the tracker maximum range of motion.

10. The system in accordance with claim 9, wherein the tracker maximum range of motion is from −60 degrees to 60 degrees.

11. The system in accordance with claim 9, wherein the tracker includes a tracker panel with a plurality of modules, wherein the rotational mechanism changes the plane of the tracking panel.

12. The system in accordance with claim 9, wherein the at least one processor is further programmed to instruct the rotational mechanism to change the plane of the tracker to be horizontal when the height of accumulation of material on the ground exceeds the height of the tracker minus the safety margin.

13. A method for operating a tracker, the method implemented by at least one processor in communication with at least one memory device, the method comprises:
    detecting a height of accumulation of material on the ground at a first point in time;
    calculating a first maximum range of motion for the tracker based on the height of accumulation of material on the ground at the first point in time, wherein the tracker will not intersect with the height of material on the ground within the first maximum range of motion;
    determining a first angle for the tracker within the first maximum range of motion; and
    changing a plane of the tracker to the first angle.

14. The method in accordance with claim 13 further comprising maximizing the energy yield for the tracker by minimizing the angle between the sun vector and the normal vector of the plane of the tracker.

15. The method in accordance with claim 13 further comprising:
    determining a position of the sun at the first point in time;
    calculating the first angle for the tracker based on the position of the sun at the first point in time and a plurality of positional and solar tracking information;
    detecting a second height of accumulation of material on the ground at a second point in time;
    determining a second maximum range of motion for the tracker based on the second height of accumulation of material on the ground, wherein the tracker will not intersect with the second height of material on the ground within the second maximum range of motion;
    adjusting the second angle for the tracker based on the second maximum range of motion for the tracker to determine a second adjusted angle, wherein the second adjusted angle is within the second maximum range of motion for the tracker; and
    changing the plane of the tracker to the second adjusted angle.

16. The method in accordance with claim 15 further comprising:
    determining if a difference between the position of the sun at the first point in time and the position of the sun at the second point in time exceeds a predetermined threshold; and
    if the difference exceeds the predetermined threshold, changing the plane of the tracker to the second adjusted angle.

17. The method in accordance with claim 13 further comprising:
    storing a tracker maximum range of motion; and
    determining the first maximum range of motion based on a height of the tracker, the height of accumulation of material on the ground, a safety margin, and a width of the tracker, wherein the first maximum range of motion is more restrictive than the tracker maximum range of motion.

18. A controller for a tracker, the controller including at least one processor in communication with at least one memory device, the at least one processor programmed to:
    detect a height of accumulation of material on the ground at a first point in time;
    calculate a first maximum range of motion for the tracker based on the height of accumulation of material on the ground at the first point in time, wherein the tracker will not intersect with the height of material on the ground within the first maximum range of motion;
    determine a first angle for the tracker within the first maximum range of motion; and
    change a plane of the tracker to the first angle.

19. The controller in accordance with claim 18, wherein the at least one processor is further programmed to:
    determine a position of the sun at a second point in time;
    calculate a second angle for the tracker based on the position of the sun;
    detect a second height of accumulation of material on the ground at the second point in time;
    determine a second maximum range of motion for the tracker based on the second height of accumulation of material on the ground, wherein the tracker will not intersect with the second height of material on the ground within the second maximum range of motion;
    adjust the second angle for the tracker based on the second maximum range of motion for the tracker to generate a second adjusted angle, wherein the second adjusted angle is within the second maximum range of motion for the tracker: and
    change the plane of the tracker to the second adjusted angle.

20. The controller in accordance with claim 19, wherein the at least one processor is further programmed to:
    determine if a difference between a position of the sun at the first point in time and the position of the sun at the second point in time exceeds a predetermined threshold: and
    if the difference exceeds the predetermined threshold, change the plane of the tracker to the second adjusted angle.

* * * * *